(12) United States Patent
Kamat et al.

(10) Patent No.: US 12,088,479 B2
(45) Date of Patent: Sep. 10, 2024

(54) MULTI-CLOUD RECOMMENDATION ENGINE FOR CUSTOMER WORKLOADS

(71) Applicant: VMWARE, INC., Palo Alto, CA (US)

(72) Inventors: Amita Vasudev Kamat, Palo Alto, CA (US); Piyush Hasmukh Parmar, Maharashtra (IN); Aalap Desai, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/072,755

(22) Filed: Dec. 1, 2022

(65) Prior Publication Data

US 2024/0073110 A1    Feb. 29, 2024

(30) Foreign Application Priority Data

Aug. 25, 2022   (IN) ............................. 202241048437

(51) Int. Cl.
*H04L 41/5061* (2022.01)
*G06F 9/50* (2006.01)

(52) U.S. Cl.
CPC ........ *H04L 41/5064* (2013.01); *G06F 9/5072* (2013.01); *G06F 2209/5019* (2013.01)

(58) Field of Classification Search
None
See application file for complete search history.

(56) References Cited

U.S. PATENT DOCUMENTS

| 2020/0310852 A1* | 10/2020 | Featonby | G06F 9/45558 |
| 2021/0160162 A1* | 5/2021 | Abbas | H04L 43/0817 |
| 2023/0102852 A1* | 3/2023 | Andrae | G06F 9/5088 370/331 |

* cited by examiner

*Primary Examiner* — Anh Nguyen
(74) *Attorney, Agent, or Firm* — King Intellectual Asset Management (57) ABSTRACT

System and computer-implemented method for generating multi-cloud recommendations for workloads uses costs and performance metrics of appropriate instance types in specific public clouds for target workloads to produce recommendation results. The appropriate instance types in the specific public clouds are determined based on instance capabilities and the workload type of the target workloads. In addition, a recommended cloud resource offering is determined for the target workloads, which is sent as a notification with the recommendation results of the appropriate instance types in the specific public clouds.

20 Claims, 8 Drawing Sheets

MULTI-CLOUD RECOMMENDATION ENGINE FOR CUSTOMER WORKLOADS

RELATED APPLICATIONS

Benefit is claimed under 35 U.S.C. 119(a)-(d) to Foreign Application Serial No. 202241048437 filed in India entitled "MULTI-CLOUD RECOMMENDATION ENGINE FOR CUSTOMER WORKLOADS", on Aug. 25, 2022, by VMware, Inc., which is herein incorporated in its entirety by reference for all purposes.

BACKGROUND

Various computing environments can be deployed in one of many available public clouds as a cloud service. For example, one or more software-defined data centers (SDDCs) may be deployed for an entity or customer in a particular public cloud via a cloud service provider, where each SDDC may include one or more clusters of host computers. These different public clouds support different types of instances in terms of their capabilities, such as central processing unit (CPU), memory, storage, network, graphics processing unit (GPU) and architecture. In addition, the public clouds offer their cloud resources at various pricing plans. Thus, selecting the appropriate public cloud from different public clouds and the computing environment from different possible computing environments for customers can be a challenging task.

SUMMARY

System and computer-implemented method for generating multi-cloud recommendations for workloads uses costs and performance metrics of appropriate instance types in specific public clouds for target workloads to produce recommendation results. The appropriate instance types in the specific public clouds are determined based on instance capabilities and the workload type of the target workloads. In addition, a recommended cloud resource offering is determined for the target workloads, which is sent as a notification with the recommendation results of the appropriate instance types in the specific public clouds.

A computer-implemented method for generating multi-cloud recommendations for workloads in accordance with an embodiment of the invention comprises determining a workload type for target workloads, determining appropriate instance types in specific public clouds based on instance capabilities and the workload type of the target workloads, calculating costs of the appropriate instance types in the specific public clouds for the target workloads, obtaining performance metrics for the appropriate instance types in the specific public clouds, producing recommendation results of the appropriate instance types in the specific public clouds based on both the costs and the performance metrics, determining a recommended cloud resource offering for the target workloads, and sending a notification with the recommendation results of the appropriate instance types in the specific public clouds and the recommended cloud resource offering. In some embodiments, the steps of this method are performed when program instructions contained in a computer-readable storage medium are executed by one or more processors.

A system in accordance with an embodiment of the invention comprises memory and at least one processor configured to determine a workload type for target workloads, determine appropriate instance types in specific public clouds based on instance capabilities and the workload type of the target workloads, calculate costs of the appropriate instance types in the specific public clouds for the target workloads, obtain performance metrics for the appropriate instance types in the specific public clouds, produce recommendation results of the appropriate instance types in the specific public clouds based on the costs and the performance metrics, determine a recommended cloud resource offering for the target workloads, and send a notification with the recommendation results of the appropriate instance types in the specific public clouds and the recommended cloud resource offering.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
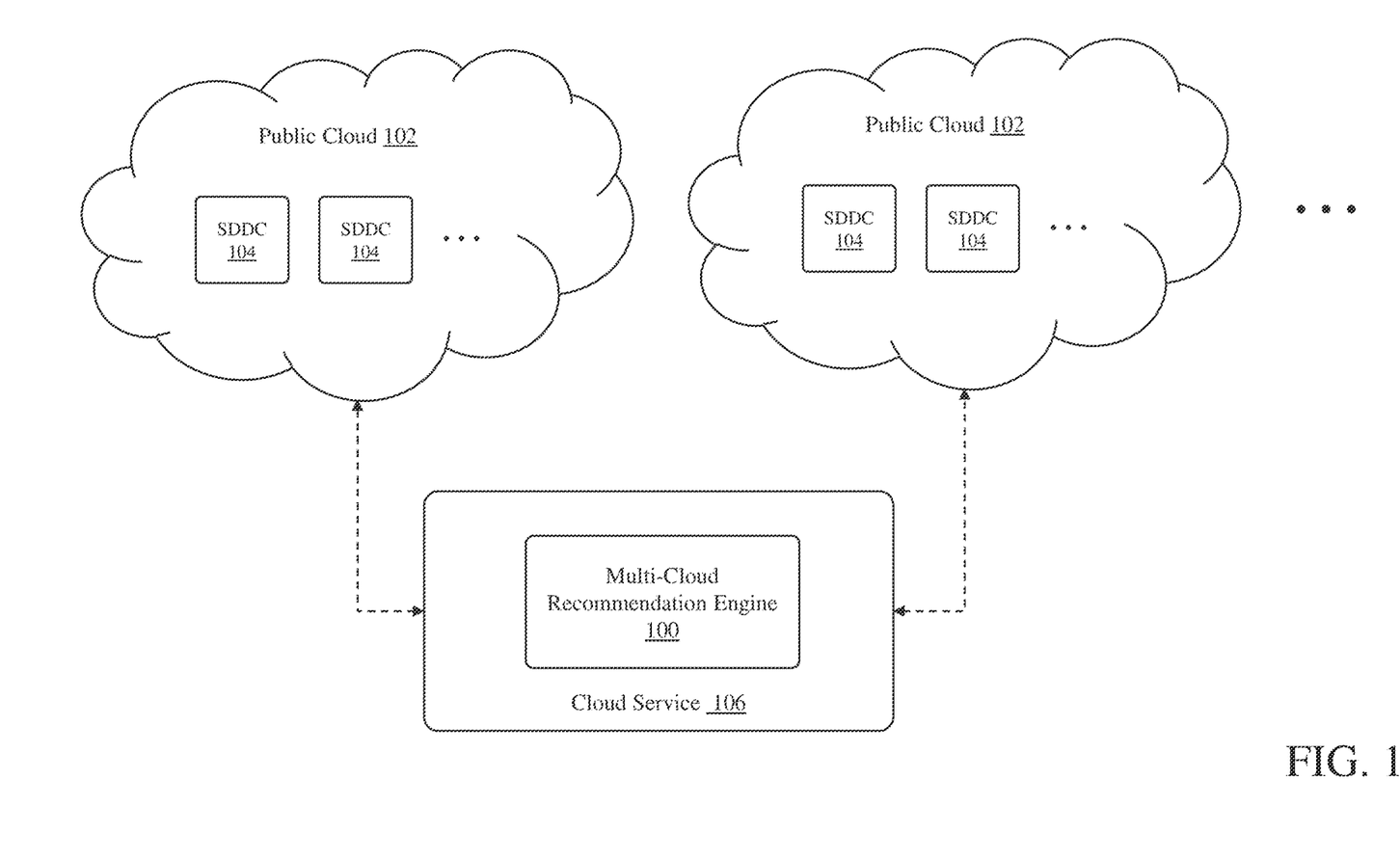
FIG. 1 illustrates a multi-cloud recommendation engine in a cloud service in accordance with an embodiment of the invention.

Turning now to FIG. 1, a multi-cloud recommendation engine 100 in accordance with an embodiment of the invention is illustrated. As described in more detail below, the multi-cloud recommendation engine 100 provides recommendations to users or customers with new workloads to be deployed or with existing workloads already deployed with respect to choices of public clouds, hardware or instance types and cloud resource offerings based on one or more preferences and/or requirements. These recommendations are made using information from the customers, as well as external services, which may provide relevant information regarding at least the appropriate instance types for target workloads based on workload type and resources needed for the target workloads.

As shown in FIG. 1, there may be a number of public clouds 102 offered by different public cloud providers that may be recommended to run workloads for customers. These public clouds 102 may offer various hardware or instance types to deploy software-defined data centers (SDDCs) 104 in which the customer workloads can run. The SDDCs deployed in the public clouds 102 or capacity portions of these SDDCs (referred to herein as SDDC slices) may be available for customers. As an example, the available public clouds 102 may include Amazon Web Services (AWS), Microsoft Azure, Google Cloud Platform (GCP), Oracle Cloud Infrastructure (OCI) and IBM Cloud.

In an embodiment, some of the SDDCs 104 deployed in the public clouds 102 or capacity portions of these SDDCs may be offered by a cloud service provider to customers as managed cloud computing environments. These managed SDDCs may be supported and managed by a cloud service 106, which includes various management and monitoring components to ensure that the managed SDDCs are running properly. In the illustrated embodiment, the multi-cloud recommendation engine 100 may be part of the cloud service 106.

Figure 2:
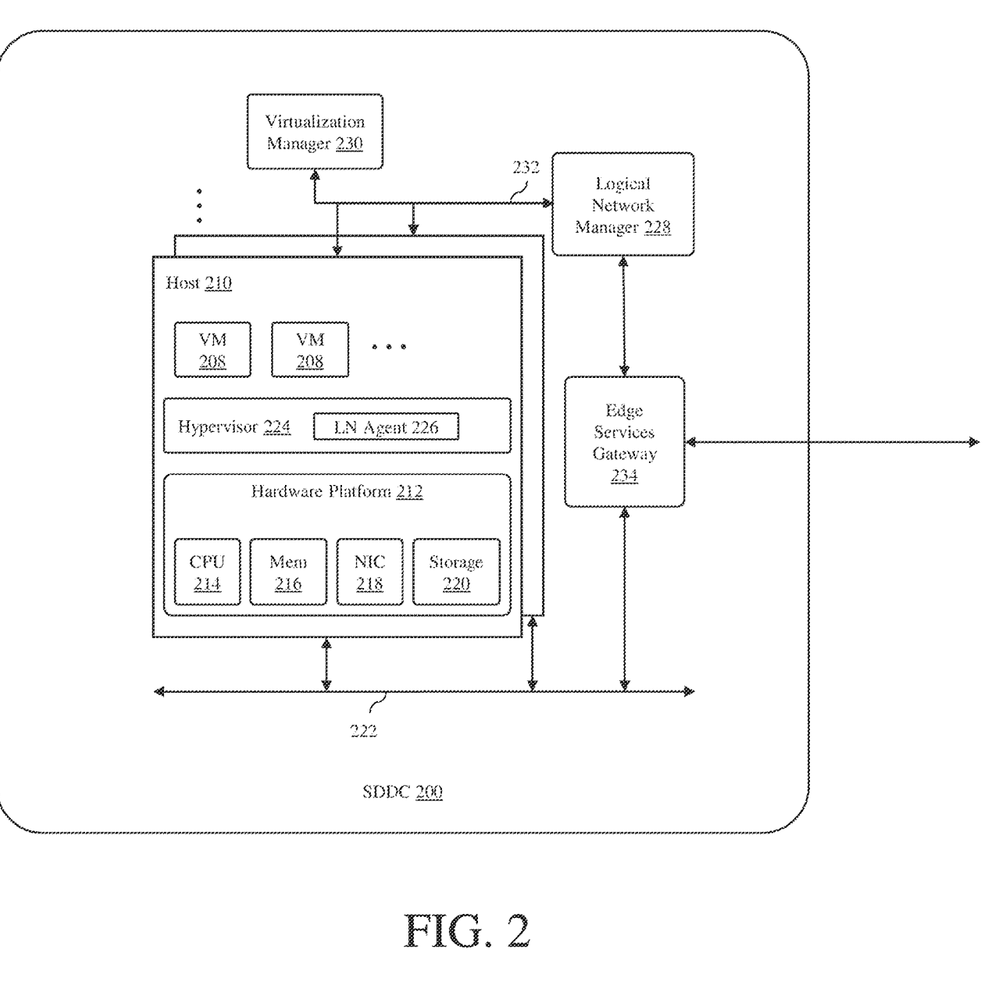
FIG. 2 is a diagram of a software-defined data center (SDDC) that can be deployed in public clouds in accordance with an embodiment of the invention.

Turning now to FIG. 2, a representative SDDC 200 that can be deployed in any of the public clouds 102 in accordance with an embodiment of the invention is illustrated. Thus, the SDDC 200 is an example of the SDDCs 104 shown in FIG. 1.

As shown in FIG. 2, the SDDC 200 includes one or more host computer systems ("hosts") 210. The hosts may be constructed on a server grade hardware platform 212, such as an x86 architecture platform. As shown, the hardware platform of each host may include conventional components of a computing device, such as one or more processors (e.g., CPUs) 214, system memory 216, a network interface 218, and storage 220. The processor 214 can be any type of a processor commonly used in servers. The memory 216 is volatile memory used for retrieving programs and processing data. The memory 216 may include, for example, one or more random access memory (RAM) modules. The network interface 218 enables the host 210 to communicate with other devices that are inside or outside of the SDDC 200 via a communication medium, such as a network 222. The network interface 218 may be one or more network adapters, also referred to as network interface cards (NICs). The storage 220 represents one or more local storage devices (e.g., one or more hard disks, flash memory modules, solid state disks and/or optical disks), which may be used to form a virtual storage area network (SAN).

Each host 210 may be configured to provide a virtualization layer that abstracts processor, memory, storage and networking resources of the hardware platform 212 into virtual computing instances, e.g., virtual machines 208, that run concurrently on the same host. The virtual machines run on top of a software interface layer, which is referred to herein as a hypervisor 224, that enables sharing of the hardware resources of the host by the virtual machines. One example of the hypervisor 224 that may be used in an embodiment described herein is a VMware ESXi™ hypervisor provided as part of the VMware vSphere® solution made commercially available from VMware, Inc. The hypervisor 224 may run on top of the operating system of the host or directly on hardware components of the host. For other types of virtual computing instances, the host may include other virtualization software platforms to support those virtual computing instances, such as Docker virtualization platform to support "containers." In the following description, the virtual computing instances 208 will be described as being virtual machines.

In the illustrated embodiment, the hypervisor 224 includes a logical network (LN) agent 226, which operates to provide logical networking capabilities, also referred to as "software-defined networking" (SDN). Each logical network may include software managed and implemented network services, such as bridging, L3 routing, L2 switching, network address translation (NAT), and firewall capabilities, to support one or more logical overlay networks in the SDDC 200. The logical network agent 226 receives configuration information from a logical network manager 228 (which may include a control plane cluster) and, based on this information, populates forwarding, firewall and/or other action tables for dropping or directing packets between the virtual machines 208 in the host 210, other virtual machines on other hosts, and/or other devices outside of the SDDC 200. Collectively, the logical network agent 226, together with other logical network agents on other hosts, according to their forwarding/routing tables, implement isolated overlay networks that can connect arbitrarily selected virtual machines with each other. Each virtual machine may be arbitrarily assigned a particular logical network in a manner that decouples the overlay network topology from the underlying physical network. Generally, this is achieved by encapsulating packets at a source host and decapsulating packets at a destination host so that virtual machines on the source and destination can communicate without regard to underlying physical network topology. In a particular implementation, the logical network agent 226 may include a Virtual Extensible Local Area Network (VXLAN) Tunnel End Point or VTEP that operates to execute operations with respect to encapsulation and decapsulation of packets to support a VXLAN backed overlay network. In alternate implementations, VTEPs support other tunneling protocols such as stateless transport tunneling (SIT), Network Virtualization using Generic Routing Encapsulation (NVGRE), or Geneve, instead of, or in addition to, VXLAN.

The SDDC 200 also includes a virtualization manager 230 that communicates with the hosts 210 via a management network 232. In an embodiment, the virtualization manager 230 is a computer program that resides and executes in a computer system, such as one of the hosts, or in a virtual computing instance, such as one of the virtual machines 208 running on the hosts. One example of the virtualization manager 230 is the VMware vCenter Server® product made available from VMware, Inc. In an embodiment, the virtualization manager is configured to carry out administrative tasks for a cluster of hosts that forms an SDDC, including managing the hosts in the cluster, managing the virtual machines running within each host in the cluster, provisioning virtual machines, migrating virtual machines from one host to another host, and load balancing between the hosts in the cluster.

As noted above, the SDDC 200 also includes the logical network manager 228 (which may include a control plane cluster), which operates with the logical network agents 226 in the hosts 210 to manage and control logical overlay networks in the SDDC 200. Logical overlay networks comprise logical network devices and connections that are mapped to physical networking resources, e.g., switches and routers, in a manner analogous to the manner in which other physical resources as compute and storage are virtualized. In an embodiment, the logical network manager 228 has access to information regarding physical components and logical overlay network components in the SDDC. With the physical and logical overlay network information, the logical network manager 228 is able to map logical network configurations to the physical network components that convey, route, and filter physical traffic in the SDDC 200. In one particular implementation, the logical network manager 228 is a VMware NSX® product running on any computer, such as one of the hosts or a virtual machine in the SDDC 200.

The SDDC 200 also includes a gateway 234 to control network traffic into and out of the SDDC 200. In an embodiment, the gateway 234 may be implemented in one of the virtual machines 208 running in the SDDC 200. In a particular implementation, the gateway 234 may be an edge services gateway. One example of the edge services gateway 234 is VMware NSX® Edge™ product made available from VMware, Inc.

Figure 3:
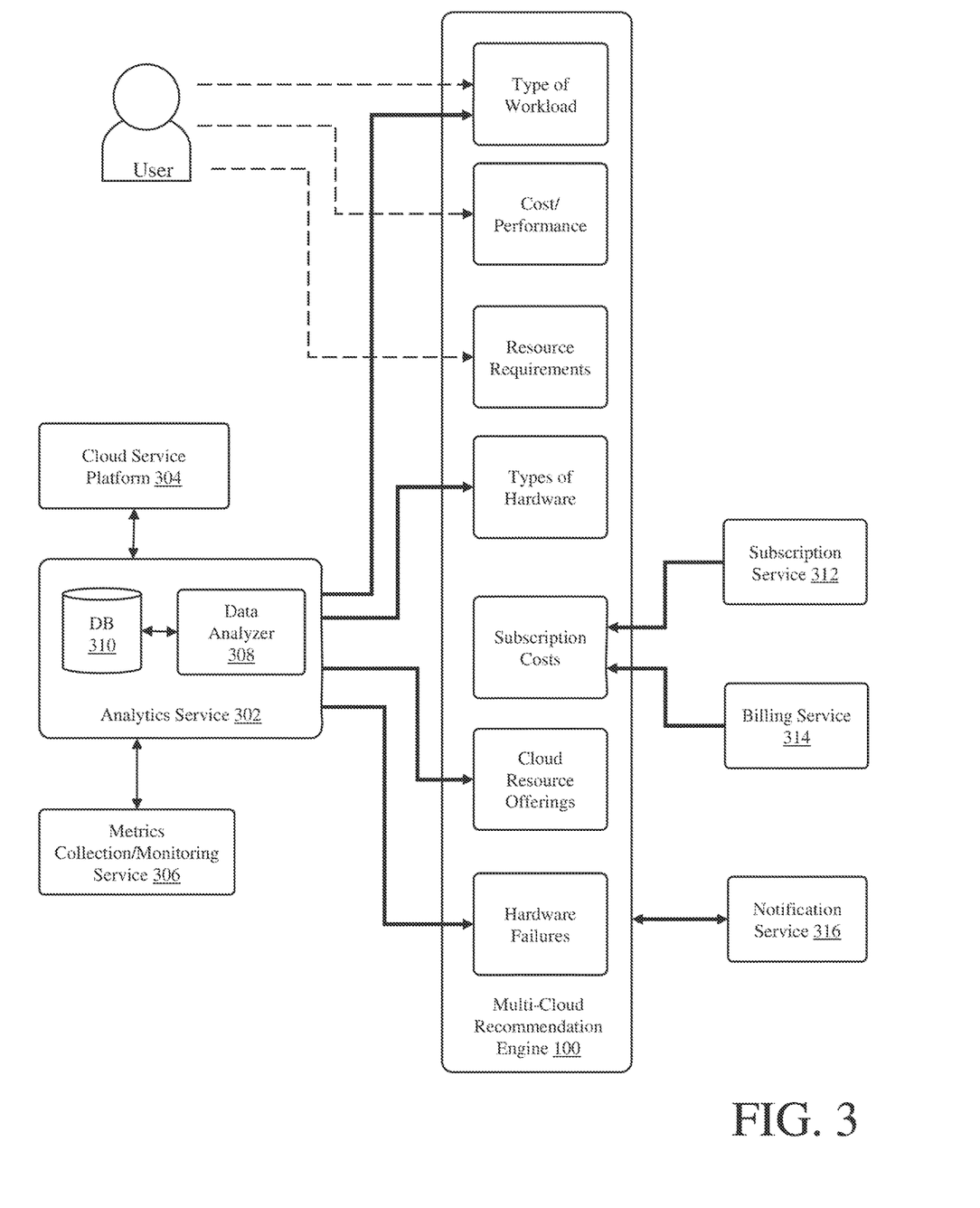
FIG. 3 shows the multi-cloud recommendation engine with external services that provide some of the parameters used to make recommendations in accordance with an embodiment of the invention.

Turning back to FIG. 1, the multi-cloud recommendation engine 100 uses multiple parameters to pick the best suited instance type, public cloud and cloud resource offering for customer workloads. Some of these parameters used by the multi-cloud recommendation engine may be provided by external services and some may be provided by the customers or users. The external services and parameters used by the multi-cloud recommendation engine 100 in accordance with an embodiment of the invention are illustrated in FIG. 3. The external services will be described below along with the parameters that are used by the multi-cloud recommendation engine to make recommendations to customers.

The parameters used by the multi-cloud recommendation engine 100 may include, but not limited to, (a) cost or performance, (b) type of workload, (c) resource requirements, (d) type of hardware, (e) number of hardware failures, (f) subscription costs, and (g) type of cloud resource offerings, which are described below and illustrated in FIG. 3.

(a) The cost or performance parameter used by the multi-cloud recommendation engine 100 is a selection provided by the customer. Both cost and performance are used by the multi-cloud recommendation engine to make recommendations. However, as explained below, in case of collisions or recommendations with the same rank (e.g., the top recommendation), the priority (cost or performance) provided by each customer is used to determine the best recommendation. If cost is selected, more weightage is given to cost by the multi-cloud recommendation engine to make sure that the customer gets the most out of what the customer pays. If performance is selected, more weightage is given to performance by the multi-cloud recommendation engine to ensure workloads can perform at the desired levels.

(b) The type of workload parameter used by the multi-cloud recommendation engine 100 is a selection based on type of customer workload, which may include, but not limited to, (1) storage intensive, (2) memory intensive, (3) compute intensive, (4) GPU intensive and (5) network intensive. Storage intensive workload is workload that stores, reads and writes a significant amount of data to the disk resulting in high storage usage and I/O operations, e.g., NoSQL, databases, in-memory databases, data warehouses etc. Memory intensive is workload that stores, reads and writes a significant amount of data in the memory resulting in high memory usage, e.g., distributed databases, caches, etc. Compute intensive workload is workload that performs a significant amount of computations which results in high CPU usage and load average, e.g., deep learning applications, highly scalable multiplayer gaming applications built to handle large number of concurrent user loads, running big data analytics, etc. GPU intensive workload is workload that performs high CPU and memory intensive operations on a specialized GPU, e.g., applications performing three-dimensional (3D) rendering, video encoding, data mining, image processing, etc. Network Intensive workload is workload that performs operations resulting in high network bandwidth usage, e.g., shared object and volume storage that is accessed/mounted over network. Some applications may fall into multiple of these categories. In an embodiment, thresholds may be used to determine when a particular resource usage is considered to be high or intensive. These thresholds may vary depending on product requirements and features. For example, in Elastic DRS in VMware Cloud™, the cost policy has thresholds as follows: threshold of 90% for high CPU usage, threshold of 80% for high memory usage, and threshold of 80% for high storage usage. Similar thresholds may be used for other resource usages.

The workload type information can be obtained from either an analytics service 302 or the customer. For existing workloads in an SDDC, the type of workload can be determined from the analytic service, which analyzes the metric data for all resources. If the customer is using an SDDC slice, this information may be available from the type of cluster of instances or host computers selected by the customer if different types of clusters are available that support different hardware capabilities specifically targeted for certain workload types. For new workload deployments, this information may be provided by the customer as input, i.e., a user input indicating what type of workload the customer intents to run in a public cloud.

As illustrated in FIG. 3, the analytics service 302 may use data from various data accumulators, such as a cloud service provider platform 304 and/or one or more metrics collecting/monitoring services 306 to identify workload patterns, resource consumption and hardware performance. The cloud service provider platform 304 may be a platform that provides particular cloud resource offerings, such as VMware Cloud™ (VMC) SDDCs and VMC SDDCs slices, which can be deployed in the different public clouds 102. In providing these offerings, the cloud service provider platform 304 may collect various resource usage metrics for different workload types. The metrics collecting/monitor service 306 can be any service that monitors the different cloud resource offerings that are running in the various public clouds, which obtains resource usage metrics for different workload types from the cloud resource offering deployed in the public clouds.

The analytics service 302 includes a data analyzer 308, which uses one or more machine learning (ML) algorithms, such as neural network algorithms, to analyze all the data over time for all existing workloads to determine patterns across different dimensions/parameters, such as, but not limited to, cost, hardware performance/failures, type of hardware instance, and type of workload based on resource consumption. Based on the data, analysis is performed by the data analyzer 308 and weights are assigned to these dimensions, which can be used by the multi-cloud recommendation engine 100.

As an example, by analyzing a training data set, which may be stored in a database 310, the analytics service 302 can identify the following patterns with respect to the different parameters:

(1) i3en.metal instance types may have less failures (<10 per year), may be a significantly more costly compared to other instance types and may be used for storage intensive workload types. So, this instance type will be weighted high on failures, high for storage intensive workload types and low on cost.

(2) i3.metal instance types may have more failures (>50 per year), may be less costly compared to other instance types and may be used for regular workload types. So, this instance type will be weighted low on failures, moderately/low on storage intensive workload types and high on cost.

(3) r5.metal instance types may have less failures (<22 per year), may be moderately costly compared to other instance types and may be used for memory intensive workload types. So, this instance type will be weighted high on failures, high on memory intensive workload types and moderately on cost.

(c) The resource requirements parameter used by the multi-cloud recommendation engine 100 is provided by the customer for new workloads. This information is used to determine the best offering in the recommendation, e.g., a VMC SDDC or a VMC SDDC slice. For existing workload, the resource requirements for the customer workloads are known by the cloud service provider, which can then be provided to the multi-cloud recommendation engine 100.

(d) The type of hardware parameter used by the multi-cloud recommendation engine 100 includes various types of hardware or instance types that are available for the different public clouds 102. Each public cloud supports one or more types of hardware or instance types which have their own advantages for certain types of workloads based on their capabilities with respect to, but not limited to, CPU, memory, storage (solid-state device (SSD), non-volatile memory express (NvME) SSD, hard disk drive (HDD), etc.) and network. Based on the type of workload, the best suited hardware and public cloud to run the customer's workloads are determined by the multi-cloud recommendation engine. If cost is selected, the most cost-efficient instance type and public cloud will be picked. If performance is selected, data from the analytics service 302 will be used by the multi-cloud recommendation engine to determine which instance type gives the best performance for the workload type. Thus, the instance type and public cloud will be selected by the multi-cloud recommendation engine based on performance rather than cost.

(e) The number of hardware failures parameter used by the multi-cloud recommendation engine 100 is a value for each public cloud 102, which is one of the important factors to be considered by the multi-cloud recommendation engine. The number of hardware failures seen for running a particular type of workload in each public cloud is provided by the analytics service 302, and is used by the multi-cloud recommendation engine to compare the values for different public clouds. In an embodiment, a threshold for an acceptable number of hardware failures is defined. The public cloud with the lowest number of hardware failures will be ranked higher and private clouds with hardware failures above the threshold will be filtered out. The number of hardware failures may not be an absolute value as the distribution of different types of instances used in a public cloud can vary.

(f) The subscription costs parameter used by the multi-cloud recommendation engine 100 includes the cost of subscription for each instance type in a public cloud 102 that is owned by the customers. This subscription costs may be stored in a subscription service 312. However, customers will typically not have subscriptions to all the suitable public clouds for various instance types. If a customer does not have a subscription of the recommended public cloud and instance type, additional cost of subscription for migrating workloads to the recommended public cloud is also provided to the customer by the multi-cloud recommendation engine so that the customer can make an informed decision if the customer wants to migrate its workloads. In an embodiment, the costs of different instance types available in different public clouds are stored in the billing service 314, which can be used to estimate the subscription cost for customers to use the recommended instance type in the recommended public cloud.

(g) The type of cloud resource offerings parameter used by the multi-cloud recommendation engine 100 includes different cloud resource offering types that the multi-cloud recommendation engine will consider in making recommendations. Each cloud resource offering, e.g., an SDDC or an SDDC slice, can be viewed as a cloud computing environment in which workloads can run. The available cloud resource offering types are taken into consideration by the multi-cloud recommendation engine to determine which cloud resource offering is the best suited offering for the customers. For example, if a customer currently has an SDDC and is not consuming enough resources, using an SDDC slice may be recommended by the multi-cloud recommendation engine to make the solution more cost effective.

One of the recommendations generated by the multi-cloud recommendation engine 100 may be to migrate virtual machines (VMs) from one public cloud to another public cloud. An advantage of migrating VMs from one public cloud to another public cloud is described using an example, where a customer has two (2) SDDCs, an SDDC1 on a first public cloud and an SDDC2 on a second public cloud. The first and second public clouds may be AWS and GCP, respectively. In this example, SDDC1 has eight (8) hosts of first instance type and SDDC2 has six (6) hosts of second instance type. The first and second types of hosts may be "i3.metal" and "vel-standard-72", respectively. The customer has a 3-year subscription for both clouds, where the price per host per hour for a 3-year subscription for the first public cloud is $4.16 and for the second public cloud is $4.65. In this example, the customer is looking for a cost effective solution.

Figure 4A:
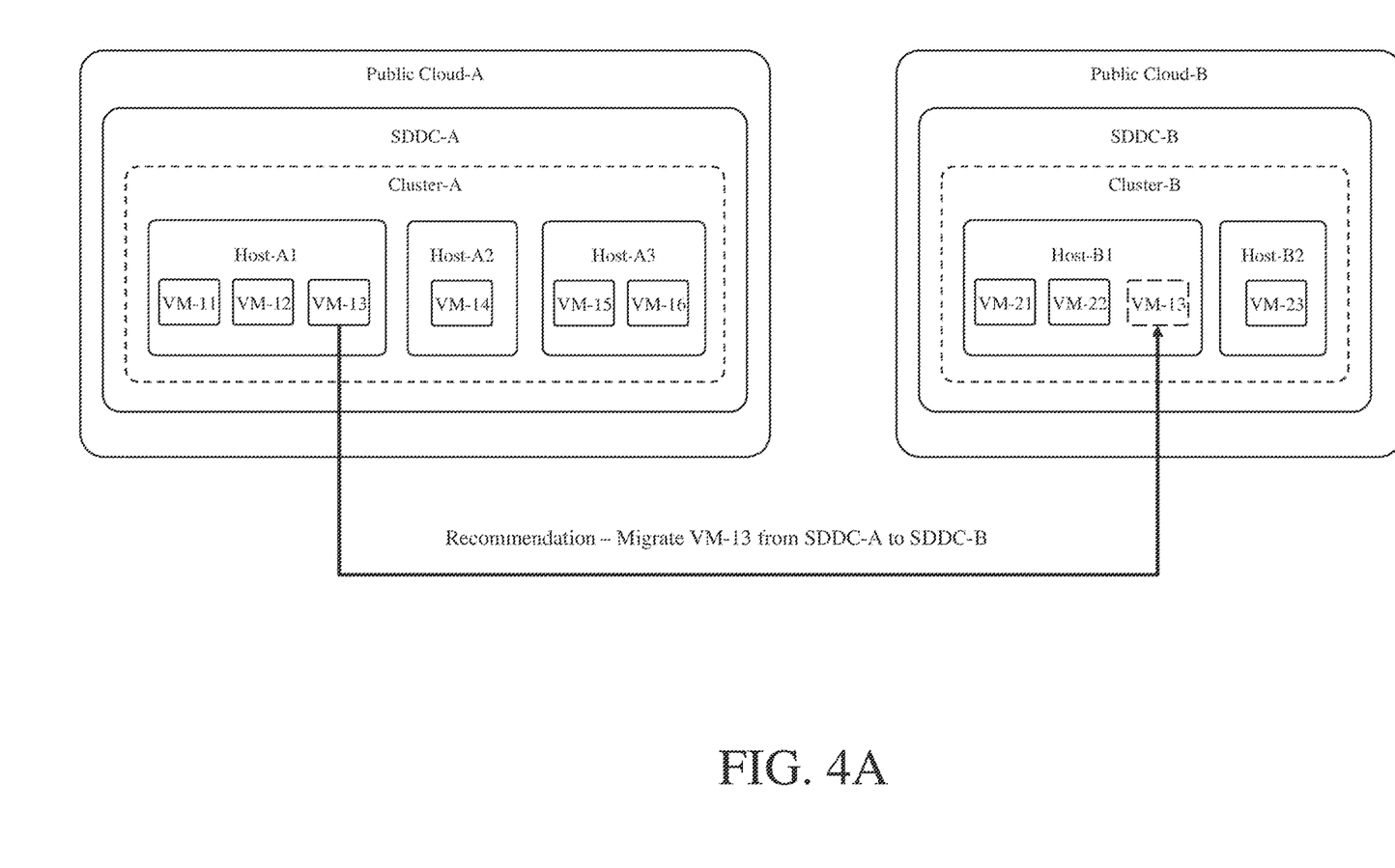
FIG. 4A illustrates a recommendation to migrate a virtual machine (VM) from one public cloud to another public cloud in accordance with an embodiment of the invention

Let's assume that analytic service pattern analysis shows that some workloads running on the first type hosts in SDDC1 are storage intensive and the hosts in SDDC2 running storage intensive workloads have had fewer hardware failures compared to the hosts in SDDC1 running storage intensive workloads. In this example, the first type host has 10.37 TB storage available, while the second type host has 19.2 TB storage available. If the recommendation made by the multi-cloud recommendation engine is to move storage intensive VMs on two (2) first type hosts in SDDC1 to one (1) second type host in SDDC2, the price difference after VM migration can be significant, as illustrated in the table below. As shown in this table, migrating a few VMs can help the customer save ~$32,149 per year or $96,447 over 3 years.

with least number of hardware failures. For this example, the multi-cloud recommendation engine 100 may recommend migrating this workload VM-13 from host-A1 in SDDC-A in public cloud-A to host-B1 in SDDC-B in public cloud-B, as illustrated in FIG. 4A.

Figure 4B:
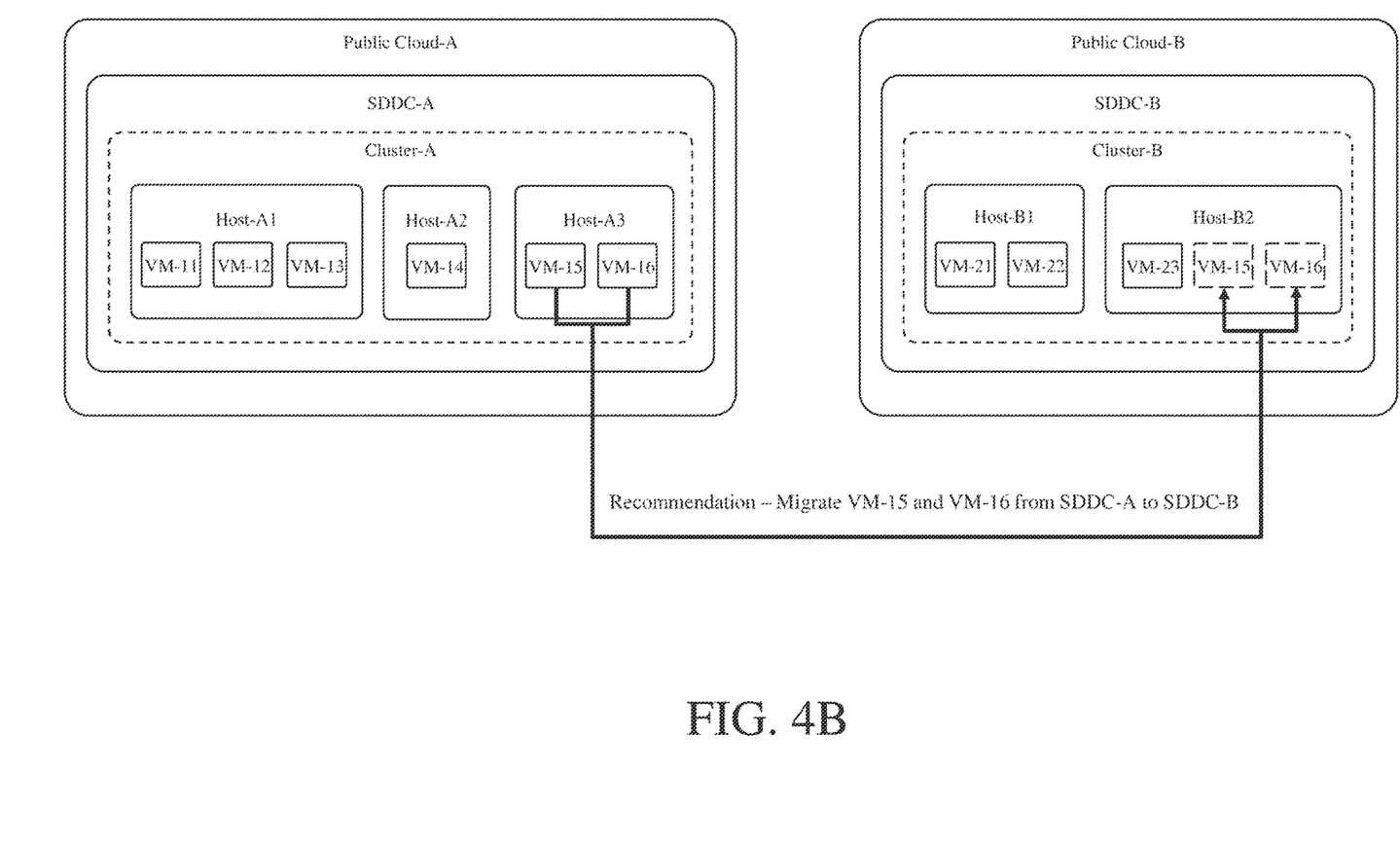
FIG. 4B illustrates a recommendation to migrate all the VMs on a host in one public cloud to a host in another public cloud in accordance with an embodiment of the invention

Another recommendation that may be made by the multi-cloud recommendation engine 100 is to migrate all VMs on a host in an SDDC hosted in a first public cloud to a host in an SDDC hosted in a second public cloud. An example of this type of recommendation is illustrated in FIG. 4B, which is similar to the example shown in FIG. 4A. However, in this example, all the VMs (i.e., VM-15 and VM-16) on host-A3 in the SDDC-A hosted in public cloud-A are storage intensive workload VMs. For this example, the multi-cloud recommendation engine 100 may recommend migrating all the VMs on host-A3 in SDDC-A in public cloud-A to host-B2 in SDDC-B in public cloud-B, as illustrated in FIG. 4B.

Similar to the example of FIG. 4B, other recommendations that may be made by the multi-cloud recommendation engine 100 is (1) to migrate all VMs in a cluster in an SDDC hosted in a public cloud to a cluster in an SDDC hosted in another public cloud and (2) to migrate all VMs in an SDDC hosted in a public cloud to an SDDC hosted in another public cloud.

Another recommendation that may be made by the multi-cloud recommendation engine 100 is to migrate all VMs from an SDDC in a public cloud to a an SDDC slice in the

| Cloud Provider | Instance Type | Hosts used for Storage Intensive VMs | Price per host per hour (3-year subscription) | Total cost per year | Total cost for 3 years |
|---|---|---|---|---|---|
| First Public Cloud Provider | First Type | 2 | $4.16 | 2 * 4.16 * 365 * 24 = $72,883.2 | $ 218,649.6 |
| First Public Cloud Provider | Second Type | 1 (after migration) | $4.65 | 4.65 * 365 * 24 = $40,734 | $ 122,202 |

The multi-cloud recommendation engine 100 can provide various recommendations depending on various conditions and/or circumstances. These recommendations may be presented to customers using a notification service 316, which may send the recommendations to a user interface. These recommendations include, but not limited to, the following examples.

A recommendation that may be made by the multi-cloud recommendation engine 100 is to migrate a VM from a host in an SDDC in one public cloud to a host in an SDDC in another public cloud. An example of this type of recommendation is illustrated in FIG. 4A, where a customer has two (2) SDDCs, SDDC-A on public cloud-A and SDDC-B on public cloud-B. SDDC-A includes cluster-A of host-A1, host-A2 and host-A3, where VM-11, VM-12 and VM-13 are running on host-A1, VM-14 is running on host-A2 and VM-15 and VM-16 are running on host-A3. The SDDC-B includes cluster-B of host-B1 and host-B2, where VM-21 and VM-22 are running on host-B1, and VM-23 is running on host-B2.

In this example, VM-13 is the only storage intensive workload VM in the SDDC-A hosted in public cloud-A, which has a high number of hardware failures. The customer is looking for performance over cost. The analytics service 302 shows that from the metrics data, hardware of public cloud-B performs better for storage intensive workloads same public cloud. As an example, consider a scenario where a customer has a 3-node SDDC deployed on a public cloud with few compute intensive workload VMs. This customer has prioritized cost over performance. In this example, a determination may be made by the multi-cloud recommendation engine that the customer will save a significant amount of money if the customer uses an SDDC slice instead of an entire SDDC. Thus, the recommendation made by the multi-cloud recommendation engine may be to create a compute intensive elastic namespace and move the workload VMs for the SDDC to the newly created SDDC slice (elastic namespace).

Another recommendation that may be made by multi-cloud recommendation engine 100 is to migrate VMs from an SDDC slice to an SDDC. As an example, consider a scenario where a customer has three (3) SDDC slices running different types of workload VMs in different public clouds. In this example, a determination may be made by the multi-cloud recommendation engine that the customer will save a significant amount of money if the customer creates a 2-node SDDC on a particular public cloud with all the workload VMs. Thus, the recommendation made by the multi-cloud recommendation engine may be to create a 2-node SDDC and then migrate all workload VMs from the three (3) SDDC slices to the SDDC.

For new deployments of given workload type and resource requirements, a recommendation that may be made by the multi-cloud recommendation engine 100 is to deploy the workload VMs on an SDDC in the recommended public cloud. Another recommendation for new deployments that may be made by the cloud recommendation engine is to deploy the workload VMs in an SDDC slice in the recommended public cloud.

Figure 5A:
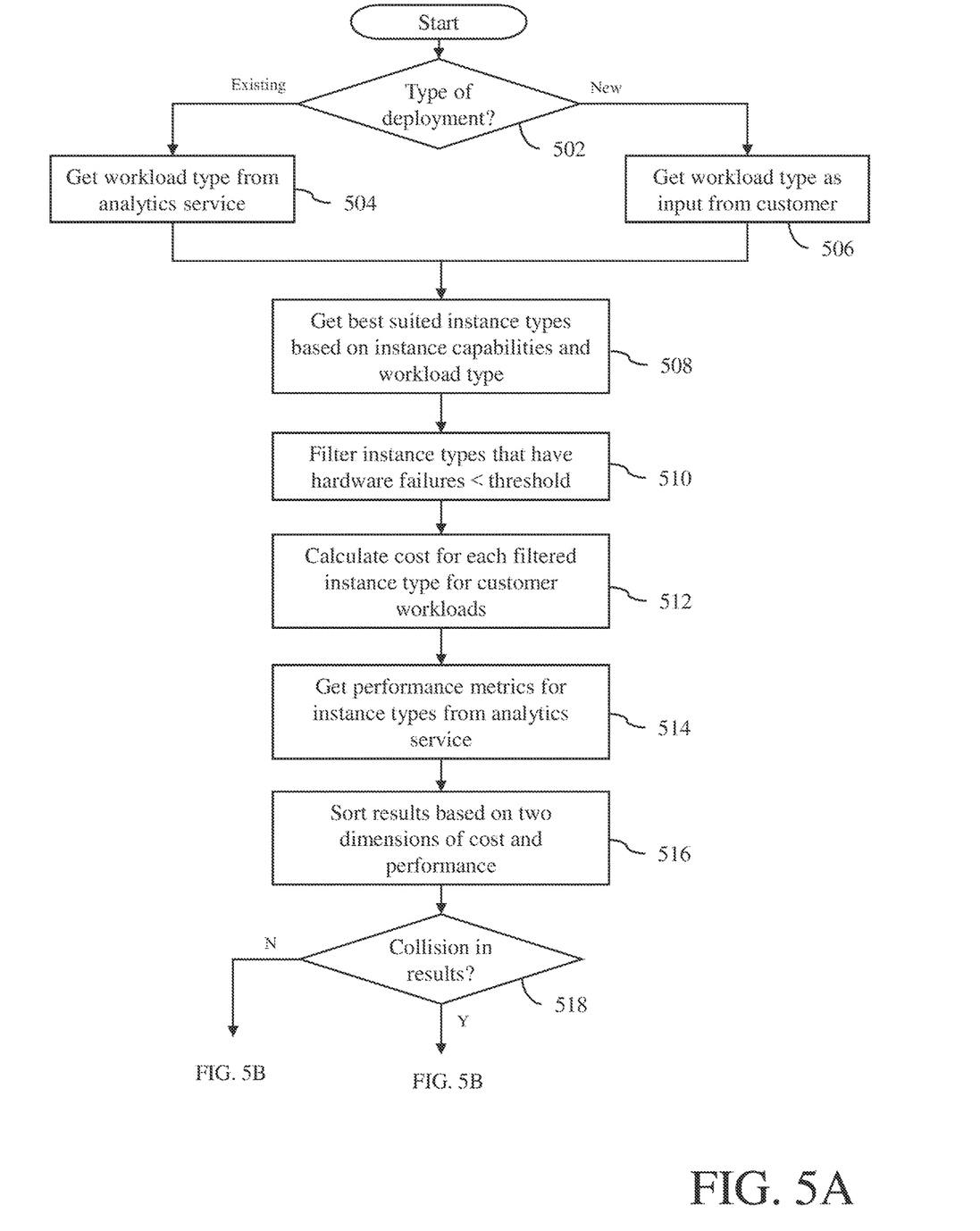
FIGS. 5A and 5B show a process flow diagram of a recommendation generating operation performed by the multi-cloud recommendation engine in accordance with an embodiment of the invention.
Figure 5B:
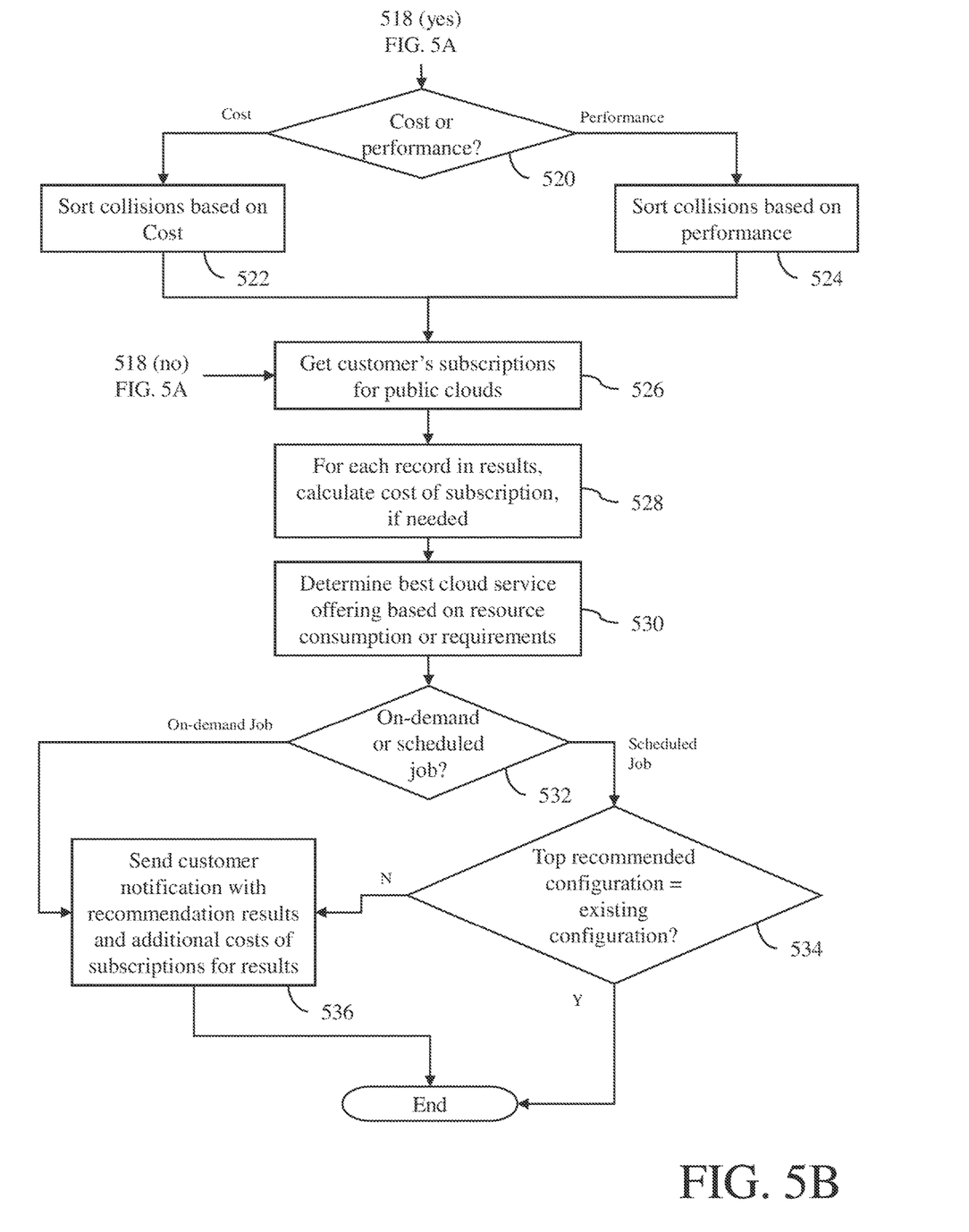

The recommendation generating operation performed by the multi-cloud recommendation engine 100 in accordance with an embodiment of the invention is described with reference to a process flow diagram shown in FIGS. 5A and 5B. The recommendation generating operation begins at step 502, where a determination is made whether the type of deployment for evaluation is an existing deployment of workloads or a new deployment of workloads. For an existing deployment, workload type is retrieved from the analytics service 302, at step 504. As an example, the workload type of the workloads may be determined by the analytics service 302 by performing an analysis of resource usage patterns of the workloads. For a new deployment, workload type is received as input from the customer, at step 506. The operation then proceeds to step 508.

At step 508, the best suited instance types are determined based on instance capabilities and workload type. Next, at step 510, the instance types that have hardware failures less than a threshold are filtered. That is, the instance types that have hardware failures equal to or greater than the threshold are excluded from being recommended.

Next, at step 512, the cost for each of the filtered instance types for the customer workloads is calculated. Next, at step 514, the performance metrics for the instance types (historic data) are retrieved from the analytics service 302.

Next, at step 516, the results are sorted based on two dimensions of cost and performance. In an embodiment, the results are sorted based on values given for cost and performance. Results with higher total values are ranked higher than others. Thus, a collision is where multiple results have same total values, i.e., the same rank. Next, at step 518, a determination is made whether there are any collisions in the results. If there are no collisions in the results, the operation proceeds to step 526. However, if there in any collisions in the results, the operation proceeds to step 520, where a determination is made whether the user has selected cost or performance. If cost has been selected, the collisions are sorted based on cost, at step 522. For example, the cheapest option is listed at the top of the results. If performance has been selected, the collisions are sorted based on performance, at step 524. For example, the best performance option is listed at the top of the results.

Next, at step 526, customer's subscriptions for public clouds are retrieved. In an embodiment, these subscriptions are retrieved from the subscription service 312.

Next, at step 528, for each record in the results, the subscription cost is calculated if needed. If the customer does not have a subscription for a public cloud in the results, the subscription cost for that public cloud is calculated. In an embodiment, the subscription costs for public clouds not known to the customer are retrieved from the billing service 314.

Next, at step 530, the best cloud resource offering is determined based on resource consumption or resource requirements. In an embodiment, the best cloud resource offering is determined from two options, an SDDC or one of several types of SDDC slices. For existing workloads, the resource consumption metrics are used to make the determination. For new deployments, the resource requirements provided by the customer are used to make the determination.

Next, at step 532, a determination is made whether the operation is an on-demand job or a scheduled job. If the process is an on-demand job, the operation proceeds to step 536, where a customer notification is sent with the recommendation results and additional costs of subscriptions for the results. If the process is a scheduled job the process proceeds to step 534, where a determination is made whether the top recommended configuration equals the existing configuration. If yes, then the operation comes to an end. If no, then the operations proceeds to step 536, where a customer notification is sent with the recommendation results and additional cost of subscription for each of the recommendation results. The operation then comes to an end.

In an embodiment, the multi-cloud recommendation engine 100 may be used with existing recommendation tools to provide recommendations for customer workload. As an example, the multi-cloud recommendation engine 100 may be used with the VMC Sizer.

In some embodiments, the multi-cloud recommendation engine 100 may be used with a migration engine that can automatically move workloads when a customer decides to act on one of the recommendations. Thus, the migration engine can facilitate workload migration from one public cloud to another public cloud.

Figure 6:
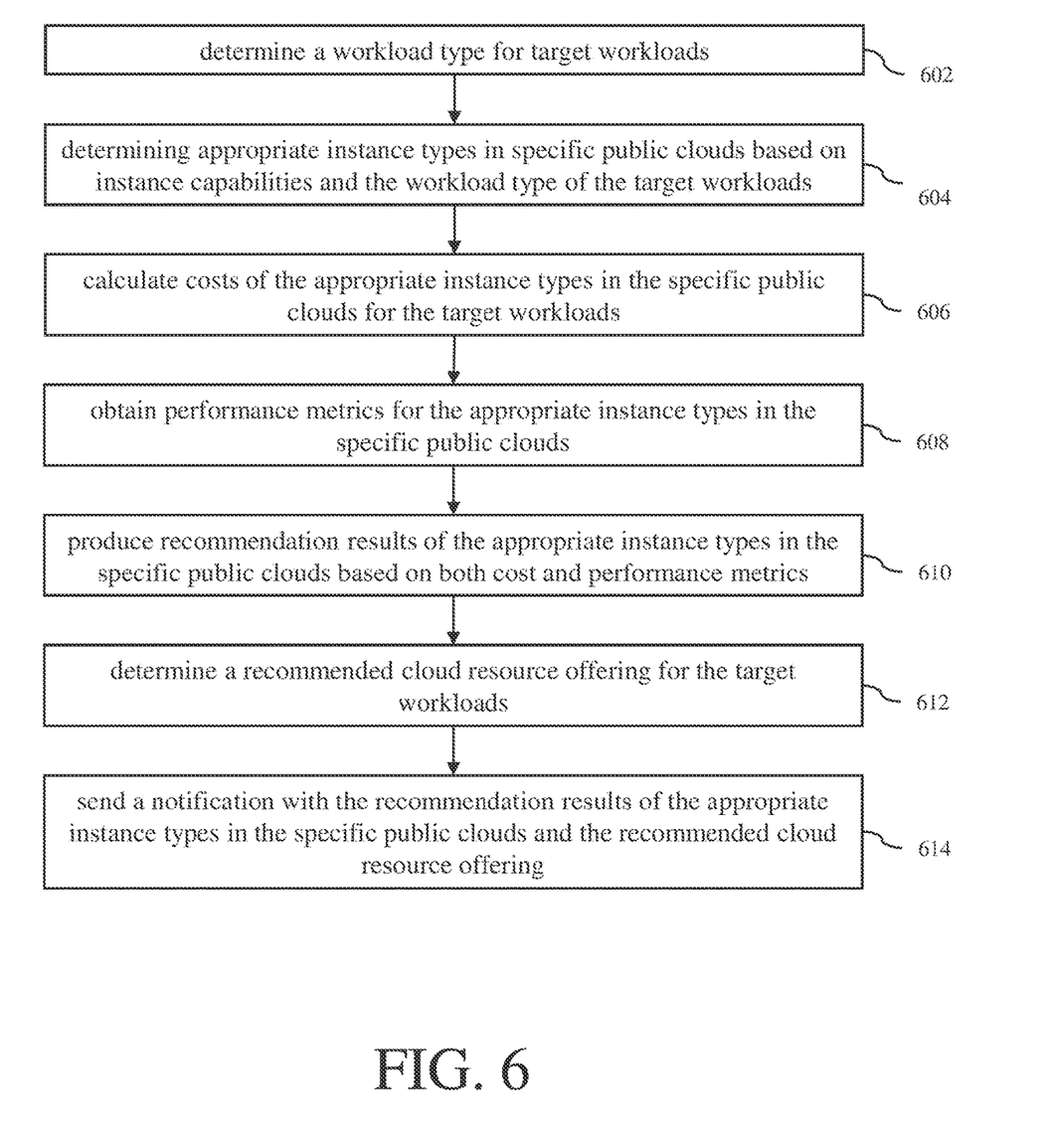
FIG. 6 is a flow diagram of a computer-implemented method for generating multi-cloud recommendations for workloads in accordance with an embodiment of the invention.

A computer-implemented method for generating multi-cloud recommendations for workloads in accordance with an embodiment of the invention is described with reference to a process flow diagram of FIG. 6. At block 602, a workload type for target workloads is determined. At step 604, appropriate instance types in specific public clouds are determined based on instance capabilities and the workload type of the target workloads. At step 606, calculating costs of the appropriate instance types in the specific public clouds for the target workloads are calculated. At step 608, performance metrics for the appropriate instance types in the specific public clouds are obtained. At step 610, recommendation results of the appropriate instance types in the specific public clouds are produced based on both cost and performance metrics. At step 612, a recommended cloud resource offering for the target workloads is determined. At step 614, a notification with the recommendation results of the appropriate instance types in the specific public clouds and the recommended cloud resource offering is sent.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-RW), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for generating multi-cloud recommendations for workloads, the method comprising:
    determining a workload type for target workloads;
    determining appropriate instance types in specific public clouds based on instance capabilities and the workload type of the target workloads;
    calculating costs of the appropriate instance types in the specific public clouds for the target workloads;
    obtaining performance metrics for the appropriate instance types in the specific public clouds;
    producing recommendation results of the appropriate instance types in the specific public clouds based on both the costs and the performance metrics;
    determining a recommended cloud resource offering for the target workloads; and
    sending a notification with the recommendation results of the appropriate instance types in the specific public clouds and the recommended cloud resource offering.

2. The computer-implemented method of claim 1, wherein determining the workload type includes determining the workload type from a plurality of workload types that includes compute intensive workloads, memory intensive workloads and storage intensive workloads.

3. The computer-implemented method of claim 1, wherein the workload type is one of a user input and an analysis of resource usage patterns of the target workloads.

4. The computer-implemented method of claim 1, wherein the performance metrics for the appropriate instance types in the specific public clouds are provided by an analytics service using historical data of the appropriate instance types in the specific public clouds.

5. The computer-implemented method of claim 1, wherein the recommended cloud service offering is selected from a plurality of cloud service offerings that includes a software-defined data center (SDDC) and an SDDC slice.

6. The computer-implemented method of claim 1, wherein determining the appropriate instance types in the specific public clouds includes excluding other instance types in public clouds based on a number of hardware failures.

7. The computer-implemented method of claim 1, further comprising:
    receiving a user input of cost or performance; and
    sorting the appropriate instance types in the specific public clouds with a same rank with respect to the cost and performance metrics based on the user input of cost or performance.

8. The computer-implemented method of claim 1, wherein the notification includes additional subscription cost for at least one of the recommendation results of the appropriate instance types in the specific public clouds and the recommended cloud resource offering.

9. A non-transitory computer-readable storage medium containing program instructions for generating multi-cloud recommendations for workloads, wherein execution of the program instructions by one or more processors causes the one or more processors to perform steps comprising:
    determining a workload type for target workloads;
    determining appropriate instance types in specific public clouds based on instance capabilities and the workload type of the target workloads;
    calculating costs of the appropriate instance types in the specific public clouds for the target workloads;
    obtaining performance metrics for the appropriate instance types in the specific public clouds;
    producing recommendation results of the appropriate instance types in the specific public clouds based on the costs and the performance metrics;
    determining a recommended cloud resource offering for the target workloads; and
    sending a notification with the recommendation results of the appropriate instance types in the specific public clouds and the recommended cloud resource offering.

10. The non-transitory computer-readable storage medium of claim 9, wherein determining the workload type includes determining the workload type from a plurality of workload types that includes compute intensive workloads, memory intensive workloads and storage intensive workloads.

11. The non-transitory computer-readable storage medium of claim 9, wherein the workload type is one of a user input and an analysis of resource usage patterns of the target workloads.

12. The non-transitory computer-readable storage medium of claim 9, wherein the performance metrics for the appropriate instance types in the specific public clouds are provided by an analytics service using historical data of the appropriate instance types in the specific public clouds.

13. The non-transitory computer-readable storage medium of claim 9, wherein the recommended cloud service offering is selected from a plurality of cloud service offerings that includes a software-defined data center (SDDC) and an SDDC slice.

14. The non-transitory computer-readable storage medium of claim 9, wherein determining the appropriate instance types in the specific public clouds includes excluding other instance types in public clouds based on a number of hardware failures.

15. The non-transitory computer-readable storage medium of claim 9, wherein the steps further comprise:
    receiving a user input of cost or performance; and sorting the appropriate instance types in the specific public clouds with a same rank with respect to the cost and performance metrics based on the user input of cost or performance.

16. The non-transitory computer-readable storage medium of claim 9, wherein the notification includes additional subscription cost for at least one of the recommendation results of the appropriate instance types in the specific public clouds and the recommended cloud resource offering.

17. A system comprising:
  memory; and
    at least one processor configured to:
      determine a workload type for target workloads;
      determine appropriate instance types in specific public clouds based on instance capabilities and the workload type of the target workloads;
      calculate costs of the appropriate instance types in the specific public clouds for the target workloads;
      obtain performance metrics for the appropriate instance types in the specific public clouds;
      produce recommendation results of the appropriate instance types in the specific public clouds based on the costs and the performance metrics;
      determine a recommended cloud resource offering for the target workloads; and
      send a notification with the recommendation results of the appropriate instance types in the specific public clouds and the recommended cloud resource offering.

18. The system of claim 17, wherein the recommended cloud service offering is selected from a plurality of cloud service offerings that includes a software-defined data center (SDDC) and an SDDC slice.

19. The system of claim 17, wherein the at least one processor is configured to exclude other instance types in public clouds based on a number of hardware failures.

20. The system of claim 17, wherein the at least one processor is configured to:
  receive a user input of cost or performance; and
  sort the appropriate instance types in the specific public clouds with a same rank with respect to the cost and performance metrics based on the user input of cost or performance.

* * * * *